(12) United States Patent
Jurng et al.

(10) Patent No.: US 9,101,908 B2
(45) Date of Patent: Aug. 11, 2015

(54) VANADIA—TITANIA CATALYST FOR REMOVING NITROGEN OXIDES AND METHOD FOR MANUFACTURING THE SAME

(71) Applicant: Korea Institute of Science and Technology, Seoul (KR)

(72) Inventors: Jong Soo Jurng, Seoul (KR); Sung Min Chin, Uijeongbu-si (KR); Eun Seuk Park, Seongnam-si (KR)

(73) Assignee: Korea Institute of Science and Technology, Seoul (KR)

( * ) Notice: Subject to any disclaimer, the term of this patent is extended or adjusted under 35 U.S.C. 154(b) by 136 days.

(21) Appl. No.: 13/686,232

(22) Filed: Nov. 27, 2012

(65) Prior Publication Data
US 2014/0018237 A1 Jan. 16, 2014

(30) Foreign Application Priority Data

Jul. 13, 2012 (KR) ........................ 10-2012-0076675

(51) Int. Cl.
*B01J 23/22* (2006.01)
*B01J 37/02* (2006.01)
*B01D 53/94* (2006.01)
*B01J 35/00* (2006.01)
*B01J 35/10* (2006.01)

(52) U.S. Cl.
CPC ............. *B01J 23/22* (2013.01); *B01D 53/9409* (2013.01); *B01J 35/002* (2013.01); *B01J 35/1019* (2013.01); *B01J 35/1038* (2013.01); *B01J 37/0201* (2013.01); *B01J 37/0211* (2013.01); *B01J 37/0213* (2013.01); *B01J 37/0238* (2013.01); *B01D 53/9418* (2013.01); *B01D 2255/20707* (2013.01); *B01D 2255/20723* (2013.01); *B01D 2255/9207* (2013.01)

(58) Field of Classification Search
CPC .... B01J 23/22; B01J 37/0211; B01J 37/0201; B01J 37/0238; B01J 37/0213; B01J 35/002; B01J 35/1019; B01J 35/1038; B01D 53/9409; B01D 53/9418; B01D 2255/9207; B01D 2255/20707; B01D 2255/20723

USPC ............................ 502/330, 353; 423/610–616
See application file for complete search history.

(56) References Cited

U.S. PATENT DOCUMENTS

| | | | | |
|---|---|---|---|---|
| 4,842,832 A | * | 6/1989 | Inoue et al. | 423/21.1 |
| 6,419,893 B1 | * | 7/2002 | Yuill et al. | 423/613 |
| 8,476,185 B2 | | 7/2013 | Chin et al. | |
| 2005/0069477 A1 | * | 3/2005 | Hong et al. | 423/239.1 |
| 2009/0142242 A1 | * | 6/2009 | Hong et al. | 423/239.1 |

FOREIGN PATENT DOCUMENTS

| | | |
|---|---|---|
| JP | 7-232075 A | 9/1995 |
| KR | 10-2005-0031037 | 4/2005 |
| KR | 10-2007-0099177 A | 10/2007 |
| KR | 10-2011-0034400 | 4/2011 |
| KR | 10-2012-0054254 A | 5/2012 |
| WO | WO 2007/114570 A1 | 10/2007 |

* cited by examiner

*Primary Examiner* — Anthony J Zimmer
(74) *Attorney, Agent, or Firm* — NSIP Law

(57) ABSTRACT

Provided is a method for preparing a vanadia-titania catalyst, comprising: vaporizing a titanium precursor; conveying the vaporized titanium precursor to a reaction unit together with an oxygen supplying source; reacting the vaporized titanium precursor conveyed to the reaction unit with the oxygen supplying source to produce titania particles; condensing the titania particles, collecting and recovering them; mixing the recovered titania particles with a vanadium precursor solution; drying the mixture of the titania particles with the vanadium precursor solution; and calcining the dried mixture under oxygen atmosphere or air. Provided also is a vanadia-titania catalyst obtained by the method. The vanadia-titania catalyst has a large specific surface area, uniform and fine nano-scaled size, and high dispersibility, thereby providing excellent nitrogen oxide removal efficiency, particularly in a low temperature range of 200° C.-250° C.

8 Claims, 11 Drawing Sheets

Fig.5
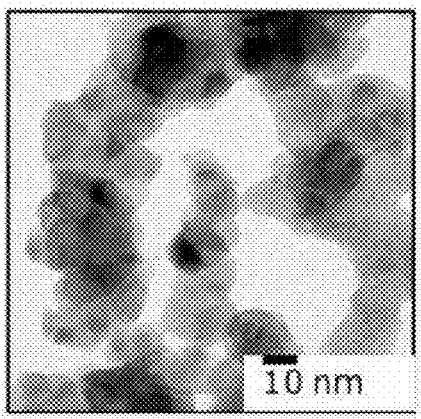
TITANIA PARTICLES OBTAINED
VIA CHEMICAL VAPOR CONDENSATION
--------> SUPPORTING VANADIA
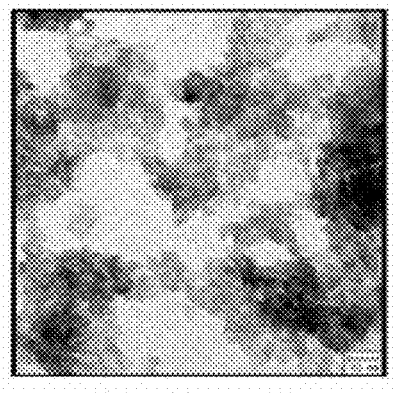
VANADIA-TITANIA
CATALYST (EX. 1)

Fig.7
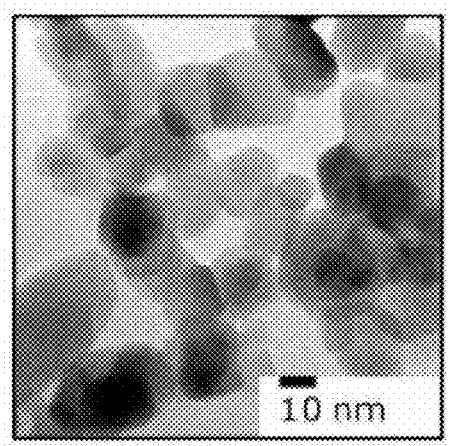
TITANIA PARTICLES
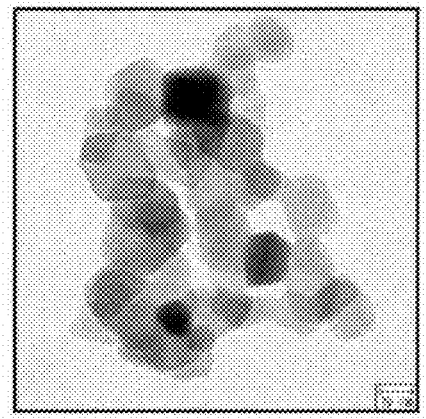
VANADIA-TITANIA
CATALYST (COMP. EX. 2)

VANADIA—TITANIA CATALYST FOR REMOVING NITROGEN OXIDES AND METHOD FOR MANUFACTURING THE SAME

CROSS-REFERENCE TO RELATED APPLICATION

This application claims priority to Korean Patent Application No. 10-2012-0076675, filed on Jul. 13, 2012, and all the benefits accruing therefrom under 35 U.S.C. §119, the contents of which in its entirety are herein incorporated by reference.

BACKGROUND

1. Field

The present disclosure relates to a vanadia-titania catalyst for removing nitrogen oxides and a method for preparing the same. More particularly, the present disclosure relates to a vanadia-titania catalyst obtained by forming titania carriers (particles) via chemical vapor condensation, and supporting vanadia onto the titania carriers (particles) through impregnation and calcining, and thus having a high specific surface area, uniform and fine nanoparticle size and excellent vanadia dispersibility, and particularly exhibiting excellent nitrogen removal efficiency at a low temperature range of 200-250° C., as well as to a method for preparing the same.

2. Description of the Related Art

In general, a great amount of nitrogen oxides are discharged from power plants or waste incineration plants, and function as a main cause of air pollution. Such nitrogen oxides comprise $N_2O$, $NO$, $N_2O_3$, $NO_2$, $N_2O_5$, $NO_3$, or the like. Particularly, $NO$ and $NO_2$ are regarded as typical nitrogen oxides discharged from power plants or incineration plants.

As methods for reducing nitrogen oxides, there are methods of optimizing combustion conditions to reduce generation of nitrogen oxides per se during combustion and methods of posttreatment comprising subjecting nitrogen oxides generated after combustion via selective non-catalytic reduction (SNCR) or selective catalytic reduction (SCR).

More particularly, SCR comprises introducing ammonia or urea to the front end of a catalyst together with exhaust gas to reduce and remove the nitrogen oxides in the exhaust gas. During the reduction, the nitrogen oxides are converted into water and nitrogen and then removed while they react with ammonia and the catalyst, as shown in the following reaction formulae:

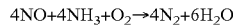

$$4NO+4NH_3+O_2 \rightarrow 4N_2+6H_2O$$

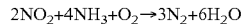

$$2NO_2+4NH_3+O_2 \rightarrow 3N_2+6H_2O$$

Such an SCR method provides excellent nitrogen oxide removal efficiency, and thus has been used commercially in most incineration plants or power plants in practice. The catalyst mostly uses titania ($TiO_2$) or its acidity-modified form, comprising $TiO—SiO_2$ or $TiO_2—ZrO_2—SiO_2$, as a carrier (support). As an active metal, a composite oxide comprising a combination of V, W, Mo, Sn, Ce, Mn, Cr and a noble metal has been used. With respect to the quality of a catalyst for removing nitrogen oxides, not only the activity of an active metal but also the quality of a catalyst carrier functions as an important factor determining the overall quality of the catalyst. In general, most catalysts for removing nitrogen oxides use $TiO_2$ as a carrier (support). $TiO_2$ is significantly more excellent than $Al_2O_3$ or zeolite in terms of electron transport. Therefore, $TiO_2$ provides a desired effect not only as a catalyst carrier but also in a removal reaction.

For example, Korean Laid-Open Patent Publication Nos. 10-2005-0031037 and 10-2011-0034400 disclose a catalyst for removing nitrogen oxides using $TiO_2$ as a carrier, and a method for removal of nitrogen oxides (denitrogenation) using the same.

Carriers of a catalyst for removing nitrogen oxides have also been prepared by a wet process, such as co-precipitation or impregnation process. However, such a process requires a relatively large number of operations, comprising dissolution, evaporation, drying, pulverization and calcining. Thus, it takes a long time of several days or more to prepare a carrier for catalyst by such a process. In addition, the prepared carrier has a relatively large primary particle size, shows low dispersibility when supporting a noble metal or transition metal thereon, and provides a small specific surface area. As a result, the final catalyst provides low catalytic activity as well as a small specific surface area, and particularly shows low activity at a low temperature range, thereby making it difficult to provide high nitrogen oxide removal efficiency.

In addition, it is known that the SCR method shows the highest nitrogen oxide removal efficiency at a temperature of 300-400° C. The temperature of exhaust as introduced to an SCR system, i.e. to a catalytic reactor operated in a power plant or incineration plant is about 200° C., which is lower than the active temperature of a catalyst. Thus, according to the related art, an exhaust gas heat exchanger of supplementary fuel has been used to increase the temperature of exhaust gas, and then the warmed exhaust gas has been introduced to carry out reaction in an SCR system. However, in this case, addition cost is required for installation and maintenance of a heat exchanger, and energy cost is increased due to high oil price, thereby increasing the manufacture cost of a catalyst. Therefore, there is a need for a technology of preparing a catalyst capable of removing nitrogen oxides sufficiently at a low temperature range less than 300° C., particularly between 200° C. and 250° C.

REFERENCES OF THE RELATED ART

Patent Document

Korean Laid-Open Patent Publication No. 10-2005-0031037

Korean Laid-Open Patent Publication No. 10-2011-0034400

SUMMARY

The present disclosure is directed to providing a vanadia-titania catalyst obtained by forming titania carriers (particles) via chemical vapor condensation, and supporting vanadia onto the titania carriers (particles) through impregnation and calcining, and thus having a high specific surface area, uniform and fine nanoparticle size and excellent vanadia dispersibility, and particularly exhibiting excellent nitrogen removal efficiency at a low temperature range of 200-250° C. The present disclosure is also directed to providing a method for preparing the vanadia-titania catalyst.

In one aspect, there is provided a method for preparing a vanadia-titania catalyst, comprising:

vaporizing a titanium precursor;

conveying the vaporized titanium precursor to a reaction unit together with an oxygen supplying source;

reacting the vaporized titanium precursor conveyed to the reaction unit with the oxygen supplying source to produce titania particles;

condensing the titania particles, collecting and recovering them;

mixing the recovered titania particles with a vanadium precursor solution;

drying the mixture of the titania particles with the vanadium precursor solution; and calcining the dried mixture under oxygen atmosphere or air.

Particularly, the operation of recovering the titania particles may comprise cooling the titania particles to condense them and collecting the condensed titania particles, wherein the cooling operation may be carried out by using a cooling system having a turbulence-forming section on a flow path of the titania particles. According to an embodiment, the cooling system may comprise an external tube, an internal tube formed in the external tube, and a coolant flow path through which a coolant flows formed between the internal tube and the external tube, wherein the internal tube has a flow path through which the titania particles pass, and the flow path may have a turbulence-forming section against which the titania particles introduced to the flow path bumps to form turbulence.

In addition, the recovered titania particles may have a specific surface area of 100 $m^2/g$-150 $m^2/g$. According to an embodiment, the operation of mixing the titania particles with a vanadium precursor solution may be carried out by dissolving a vanadium precursor into water, adding oxalic acid thereto to adjust pH to 2.5-3, heating and agitating the mixture at a temperature of 55° C.-75° C. to obtain a vanadium precursor solution, and mixing the obtained vanadium precursor solution with the titania particles.

In another aspect, there is provided a vanadia-titania catalyst for removing nitrogen oxides, comprising vanadia supported on titania particles (carriers), and having a specific surface area of 200 $m^2/g$-300 $m^2/g$. Herein, vanadia may be supported in an amount of 1-10 wt % based on the total weight of the catalyst.

According to the vanadia-titania catalyst disclosed herein, titania particles (carriers) are prepared by chemical vapor condensation, have a large specific surface area and uniform nano-scaled particle size, and particularly show an improvement in pore volume, thereby providing high dispersibility in supporting vanadia. Therefore, the vanadia-titania catalyst comprising the above-mentioned titania particles (carriers) has a uniform and fine nano-scaled size, large specific surface area and high catalytic activity and dispersibility, thereby providing excellent nitrogen oxide removal efficiency, particularly at a low temperature range of 200° C.-250° C.

BRIEF DESCRIPTION OF THE DRAWINGS

FIG. 5 is a transmission electron microscopy (TEM) image of titania particles (before supporting vanadia) according to an embodiment, and vanadia-titania catalyst particles (after supporting vanadia) comprising the titania particles on which vanadia is supported;

FIG. 7 is a TEM image of commercially available titania particles (before supporting vanadia) and vanadia-titania catalyst particles (after supporting) comprising the titania particles on which vanadia is supported according to Comparative Example 2;

| [Detailed Description of Main Elements] | |
|---|---|
| 100: titanium precursor supplying section | 120: vaporization tank |
| 140: precursor supplying line | 160: carrier gas supplying line |
| 200: oxygen supplying line | 300: reaction unit |
| 310: reaction tube | 320: heat supplying unit |
| 400: recovering unit | 410: cooling system |
| 412: external tube | 414: internal tube |
| 414a: turbulence-forming section | 420: particle collecting system |

DETAILED DESCRIPTION

Exemplary embodiments now will be described more fully hereinafter with reference to the accompanying drawings, in which exemplary embodiments are shown.

The method for preparing a vanadia-titania catalyst disclosed herein comprises preparing titania particles (carriers) through a chemical vapor condensation process, and mixing the prepared titania particles (carriers) with a solution containing a vanadium precursor dissolved therein, followed by drying and calcining.

Particularly, the titania particles (carriers) may be obtained by using the apparatus described hereinafter. First, the apparatus for preparing titania particles (carriers) that may be used herein will be described with reference to FIG. 1 and FIG. 2. Then, the method for preparing a vanadia-titania catalyst will be described.

Figure 1:
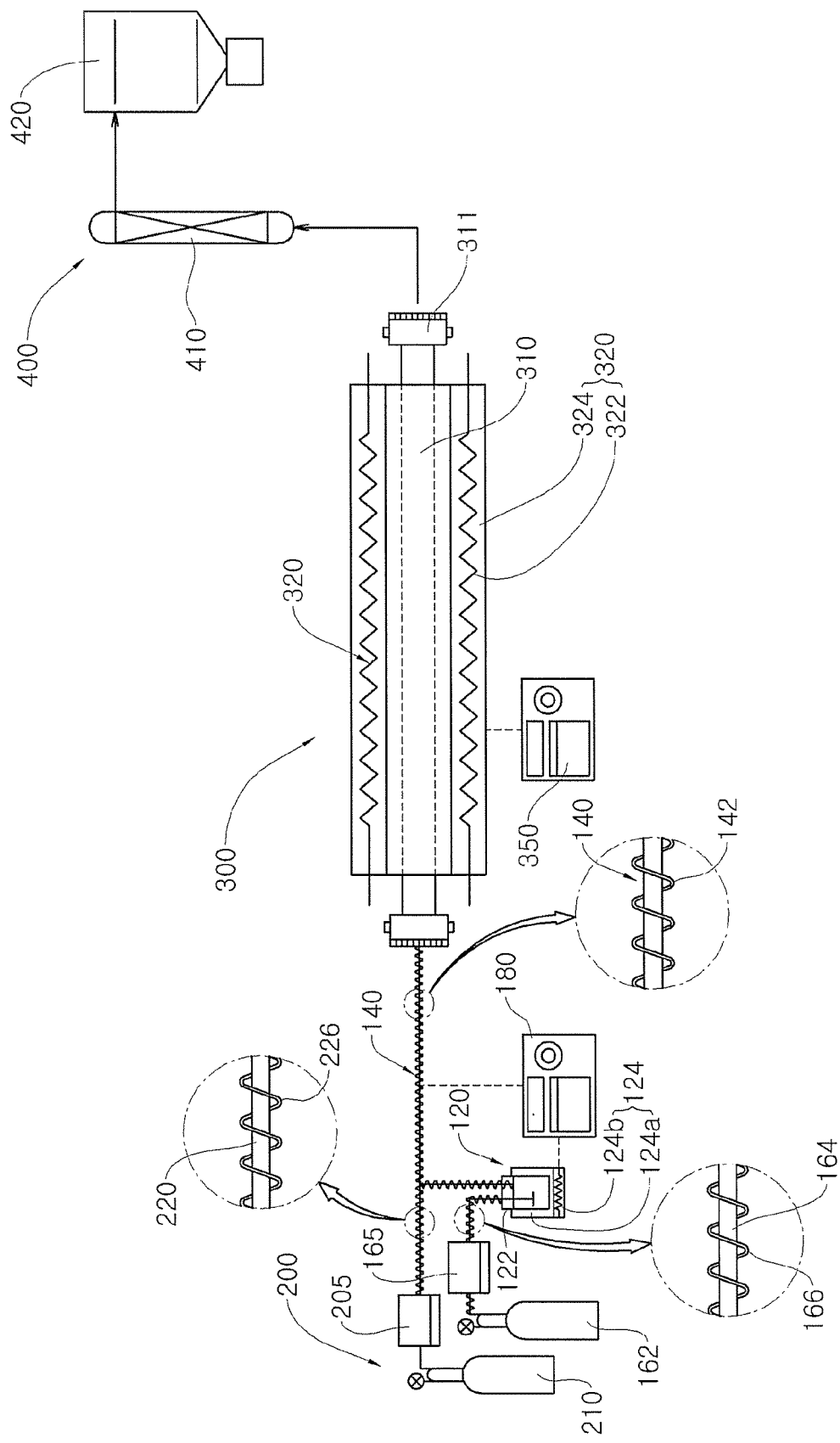
FIG. 1 is a schematic view illustrating an apparatus for preparing titanium particles (carriers) that may be used in accordance with an embodiment.
Figure 2:
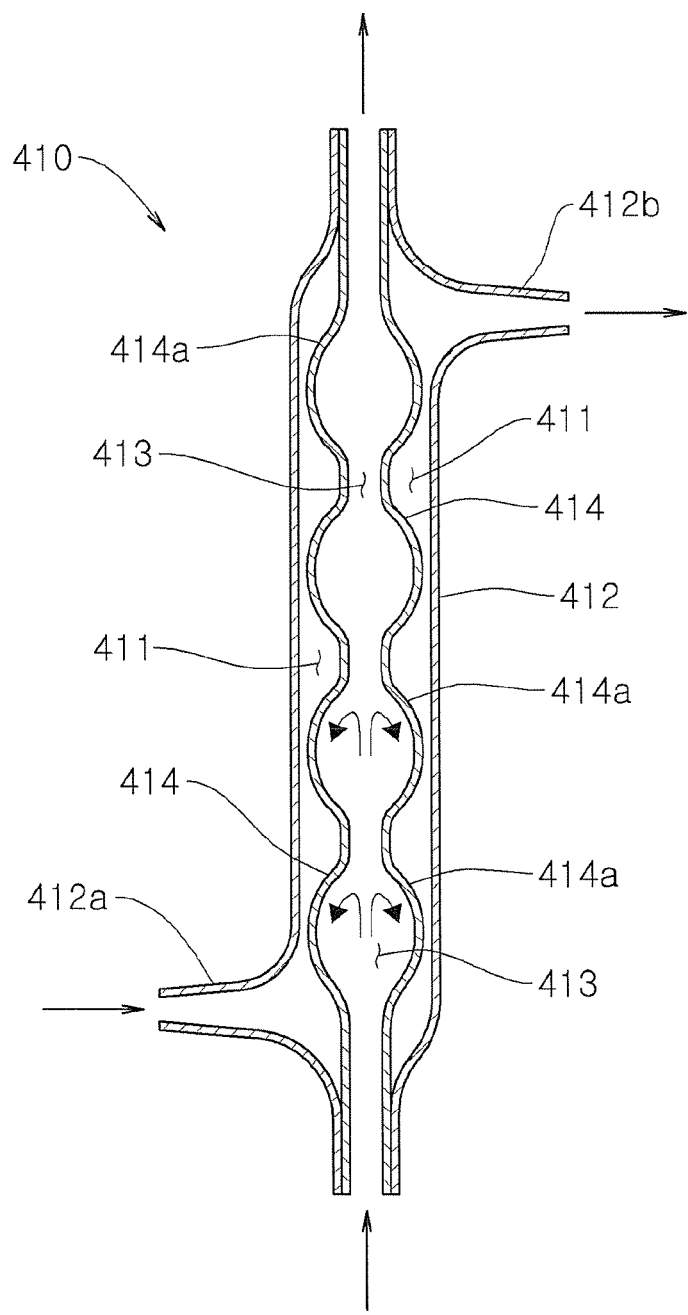
FIG. 2 is a schematic sectional view illustrating a particular embodiment of a cooling system consisting of an apparatus for preparing titanium particles (carriers) that may be used in accordance with an embodiment.

The apparatus as shown in FIG. 1 and FIG. 2 is for use in preparing titania particles (carriers) via a chemical vapor condensation process. FIG. 1 is a schematic view of the apparatus and FIG. 2 is a schematic sectional view illustrating a particular embodiment of a cooling system consisting of the apparatus.

Referring to FIG. 1 and FIG. 2, the apparatus comprises: a titanium precursor supplying unit 100 in which a titanium (Ti) precursor is allowed to vaporize (volatilize) and supplied to a reaction unit 300; an oxygen supplying line 200 through which an oxygen source is supplied to a reaction unit 300; a reaction unit 300 in which the titanium precursor supplied from the titanium precursor supplying unit 100 is converted to produce titania particles (carriers); and a recovery unit 400 in which the titania particles produced at the reaction unit 300 are condensed and collected.

The titanium precursor supplying unit 100 is not particularly limited, as long as it allows a titanium precursor to vaporize (volatilize) so as to be supplied to the reaction unit 300. In other words, in the titanium precursor supplying unit 100, a vaporized product of titanium precursor is produced, and then is conveyed and supplied to the reaction unit 300. The vaporized product of titanium precursor is forced to be conveyed and supplied through a carrier member. For example, the carrier member may be selected from a carrier gas, pump and blower fan. More particularly, a carrier gas may be used advantageously as described hereinafter.

According to an embodiment, the titanium precursor supplying unit 100 may comprise a vaporization tank 120 in which the titanium precursor is vaporized, a precursor supplying line 140 through which the vaporized product of titanium precursor is conveyed and supplied to the reaction unit 300, and a carrier gas injection line 160 through which a carrier gas is introduced to the vaporization tank 120 as a carrier member.

The vaporization tank 120 may consist of various forms. For example, the vaporization tank 120 may comprise a bubbler 122 in which a titanium precursor is received and vaporized, and a heating source 124 applying heat to the bubbler 122.

The bubbler 122 may have various container shapes, such as a cylindrical or polyprismatic shape. In addition, a plate may be installed inside the bubbler 122, and such a plate may have a single layer or two or more layers.

The heating source 124 is not particularly limited, as long as it supplies heat to the bubbler 122. For example, the heating source 124 may be selected from a heating wire or band heater to which electric power is applied to emit heat. The heating source 124, such as a heating wire or band heater, may be installed in such a manner that it is wound around the outer circumference of the wall body of the bubbler 122 or it is embedded inside the bubbler 122.

Particularly, the heating source 124 may comprise an oil bath maintaining high temperature. More particularly, the heating source 124 may comprise an oil bath 124a in which oil is received, and a heating member 124b for heating the oil. As shown in FIG. 1, a heating wire may be used as the heating member 124b. When using the oil bath 124a containing hot oil as the heating source 124 applying heat to the bubbler 122, it is possible to prevent rapid warming and to supply heat uniformly to the whole regions of the bubbler 122.

The vaporized product of titanium precursor generated at the vaporization tank 120 is conveyed and supplied to the reaction unit 300 along the precursor supplying line 140. The precursor supplying line 140 is connected to the vaporization tank 120 at one side and to the reaction unit 300 at the other side. More particularly, one side of the precursor supplying line 140 may be connected to the bubbler 122 of the vaporization tank 120, and the other side thereof may be coupled with the reaction tube 310 of the reaction unit 300 through a coupling member 311 such as a flange.

According to an embodiment, the precursor supplying line 140 may be provided with a constant temperature-maintaining member 142 preventing the condensation of the vaporized product of titanium precursor. The constant temperature-maintaining member 142 may be one capable of preventing the vaporized product of titanium precursor from being condensed while it is conveyed along the supplying line 140. The constant temperature-maintaining member 142 is a heat-insulating or heating member. For example, the constant temperature-maintaining member 142 may be selected from a heat-insulating material, heating wire or band heater formed on the outer circumference of the precursor supplying line 140. More particularly, the constant temperature-maintaining member 142 may be selected from a heating wire wound on the outer circumference of the precursor supplying line 140.

In addition, the carrier gas injection line 160 is for use in injecting a carrier gas to the vaporization tank 120. The carrier gas serves as a carrier that allows the vaporized product of titanium precursor to be conveyed and supplied easily to the reaction unit 300. Particularly, the vaporized product of titanium precursor generated at the vaporization tank 120 is conveyed and supplied to the reaction unit 300 along the precursor supplying line 140 by the carrying operation of the carrier gas.

The carrier gas injection line 160 is not particularly limited, as long as it allows injection of a carrier gas to the vaporization tank 120. For example, the carrier gas injection line 160 comprises a bombe 162 in which a carrier gas is stored, and an injection line 164 providing a flow path through which the carrier gas stored in the bombe 162 is conveyed and supplied to the vaporization tank 120. The injection line 164 is connected to the bombe 162 at one end and is embedded in the bubbler 122 of the vaporization tank 120 at the other end.

The carrier gas is not particularly limited, as long as it is capable of carrying the vaporized product of titanium precursor. Although there is no particular limitation, the carrier gas may be any one selected from the group consisting of argon (Ar), nitrogen ($N_2$), helium (He), oxygen ($O_2$) and air, or a mixed gas of at least two of them. More particularly, the carrier gas may be argon (Ar).

The carrier gas injection line 160 may further comprise a mass flow controller (MFC) 165 controlling the injection flux of the carrier gas. As shown in FIG. 1, such a mass flow controller 165 may be provided on the injection line 164. The feed flux of the vaporized product of titanium precursor supplied to the reaction unit 300 may be controlled by the injection flux of the carrier gas. In a variant, the feed flux of the vaporized product of titanium precursor may be controlled by a flux controller (not shown) provided on the precursor supplying line 140.

In addition, the carrier gas may be maintained at an adequate temperature. When the carrier gas is injected to the vaporization tank 120 at an excessively low temperature, the vaporized product of titanium precursor in the vaporization tank 120 may be condensed to produce liquid mist. Therefore, the carrier gas may be maintained approximately at the same temperature as the vaporized product of titanium precursor in the vaporization tank 120. For this, the carrier gas injection line 160 may further comprise a heat insulating member or heating member. For example, such a heat insulating or heating member may be provided on the bombe 162. Particularly, the heat insulating or heating member may be provided on the injection line 164 through which the carrier gas flows. In addition, the heat insulating or heating member may be selected from a heat insulating material, heating wire and band heater. In FIG. 1, a heating wire 166 is formed on the injection line 164 as a heating member.

Further, the titanium precursor supplying unit 100 may further comprise a temperature controller 180. The temperature controller 180 controls the heating source 124 of the vaporization tank 120 so that an adequate amount of heat is supplied to the bubbler 122. The temperature of the heating source 124 controlled by the temperature controller 180 may vary with the particular type of the titanium precursor. The temperature of the heating source 124 may be determined by the boiling point of the titanium precursor. For example, the temperature may be controlled to 80-110° C. In addition, the temperature controller 180 controls not only the temperature of the vaporization tank 120 but also that of the vaporized product of titanium precursor flowing through the precursor supplying line 140 or that of the carrier gas. In other words, the temperature controller 180 may control the temperature of the constant temperature maintaining member 142 installed on the precursor supplying line 140 and/or the temperature of the heating wire 166 formed on the carrier gas injection line 164.

The titanium precursor is not particularly limited, as long as it is a compound containing titanium (Ti) in its molecule. The titanium precursor contains at least titanium (Ti) in its molecule and may further contain an oxygen atom (O). For example, although there is no particular limitation, the titanium precursor may be at least one selected from titanium salts and organotitanium compounds. Particular examples of the titanium salts comprise titanium tetrachloride ($TiCl_4$). Particularly, the titanium precursor may be selected from organotitanium compounds, comprising titanium alkoxides.

More particularly, the titanium precursor may be at least one selected from the group consisting of titanium alkoxides, such as titanium tetramethoxide, titanium tetraethoxide, titanium tetra-n-propoxide, titanium tetra-iso-propoxide and titanium tetra-n-butoxide. Among those, titanium tetra-iso-propoxide (TTIP, $Ti[OCH(CH_3)_2]_4$) is particularly useful.

The oxygen supplying line 200 is for use in supplying an oxygen source to the reaction unit 300. According to an exemplary embodiment, the oxygen supplying line 200 may comprise a storage tank 210 in which an oxygen source is stored, and an oxygen conveying line 220 through which the oxygen source stored in the storage tank 210 is supplied. The oxygen conveying line 220 is connected to the storage tank 210 at one side and to the reaction tube 310 of the reaction unit 300 at the other side. Particularly, as shown in FIG. 1, the oxygen conveying line 220 may be connected to the storage tank 210 at one side and connected integrally to the precursor supplying line 140 at other side.

In the storage tank 210, at least one oxygen source, such as one selected from oxygen ($O_2$) and air, may be charged and stored. In addition, the oxygen supplying line 200 may further comprise a mass flow controller (MFC) 205 controlling the feed flux of the oxygen source, and such an MFC 205 may be provided on the oxygen conveying line 220 as shown in FIG. 1.

Further, the oxygen source may be maintained at an adequate temperature. Particularly, when the oxygen source is supplied to the reaction unit 300 at an excessively low temperature, it may cause condensation of the vaporized product of titanium precursor generated at the titanium precursor supplying unit 100 upon the contact with the latter. Thus, the oxygen source may be maintained approximately at the same temperature as the vaporized product of titanium precursor. For this, the oxygen supplying line 200 may further comprise a heat insulating member or heating member. For example, the storage tank 210 may be provided with a heat insulating member or heating member, or the oxygen conveying line 220 may be provided with a heat insulating member or heating member. The heat insulating member or heating member may be selected from a heat insulating material, heating wire and band heater as mentioned above. In FIG. 1, a heating wire 226 formed on the oxygen conveying line 220 is exemplified as a heating member.

The reaction unit 300 generates titania particles (carriers) from the vaporized product of titanium precursor introduced thereto. Particularly, the reaction unit 300 is maintained at high temperature so that titania particles are produced via chemical vapor synthesis. The reaction unit 300 comprises a reaction tube 310 in which reaction occurs, and a heat supplying member 320 supplying heat to the reaction tube 310 at high temperature.

The reaction tube 310 has a tubular shape and may comprise a metallic or ceramic material. Particularly, the reaction tube 310 may be selected from an alumina tube, quartz tube and mullite tube.

The heat supplying member 320 may be one capable of supplying heat to the reaction tube 310 and have various forms. For example, the heat supplying member 320 may comprise a heating wire or band heater emitting heat under the application of electric power. The heat supplying member 320 such as a heating wire or band heater may be formed along the length of the reaction tube 310 singly or in groups of two or more. In a variant, the heat supplying member 320 may be wound spirally on the outer circumference of the reaction tube 310. In addition, as shown in FIG. 1, the heat supplying member 320 may be selected from an externally warmed electric furnace having a heating wire 322 embedded in a thermally conductive coating body 324, and the like. In another variant, the heat supplying member 320 may be a hot fluid flowing through the double jacket-type reaction tube 310. The heat supplying member 320 is not limited to the above-described embodiment, and any heat supplying member capable of supplying heat to the reaction tube 310 may be used.

In addition, the reaction unit 300 may further comprise a temperature controller 350. The temperature controller 350 may control the heat supplying member 320 to adjust the internal temperature of the reaction tube 310 to an adequately high temperature. For example, the internal temperature of the reaction tube 310 may be maintained at 700-1200° C. Further, the reaction tube 310 may be maintained at ambient pressure (atmospheric pressure) or may be present in a vacuum state below ambient pressure by a depressurization chamber (not shown).

The titania particles prepared at the reaction unit 300 are nano-sized fine particles, and are collected and recovered at a recovery unit 400. In other words, the titania particles prepared at the reaction tube 310 are introduced to the recovery unit 400 under the carrying operation of the carrier gas and collected/recovered at the recovery unit 400.

The recovery unit 400 comprises a cooling system 410 in which the product ejected from the reaction unit 300 is condensed (cooled), and a particle collecting system 420 collecting and recovering the titania particles contained in the product. The particle collecting system 420 is not particularly limited, as long as it is capable of collecting and recovering the titania particles. For example, the particle collecting system may be selected from a cyclone-type collecting system, gravity-settling type collecting system and a filtering type collecting system.

The cooling system 410 cools (condenses) the hot product (i.e. fluid containing the titania particles) ejected from the reaction unit 300. The cooling system 410 may be coupled with the reaction tube 310 of the reaction unit 300 through a coupling member 311 such as a flange. The cooling system 410 may be a conventional system, such as a thermophoretic type system. Particularly, the cooling system may comprise a turbulence-forming section 414a, such as a ball-like shape. More particularly, when using a cooling system 410 that has a general structure, such as a system having a thermophoretic type linear cooling tube, cooling efficiency for the hot gas containing the titania particles may be lowered and the characteristics of the titania particles may be degraded. Thus, according to an embodiment, a rapid cooling system 410 comprising a turbulence-forming section 414a, such as a ball-like shape may be used. FIG. 2 shows a sectional schematic view of such a rapid cooling system 410 according to an embodiment.

Referring to FIG. 2, the rapid cooling system 410 has a double tubular shape comprising an external tube 412 and an internal tube 414 formed inside the external tube 412. In addition, a coolant flow path 411 through which a coolant flows is formed between the internal tube 414 and the external tube 412, and the external tube 412 is provided with a coolant inlet 412a and a coolant outlet 412b. As shown in FIG. 2, the internal tube 414 has a fluid flow path 413 through which a hot fluid (fluid containing hot titania particles) passes, and is provided with a turbulence-forming section 414a against which the fluid bumps to generate turbulence. The turbulence-forming section 414a is any one capable of forming turbulence. For example, it has a ball-like shape as shown in FIG. 2. More particularly, the turbulence-forming section 414a has a ball-like shape with the internal tube 414 protruding out toward the exterior, and may have a circular or elliptic sectional shape. The turbulence-forming section 414a may be formed along the length of the internal tube 414 singly or in groups of two or more.

Therefore, the coolant introduced through the coolant inlet 412a flows along the coolant flow path 411 formed between the internal tube 414 and the external tube 412, while it allows cooling of the hot fluid (titania particles) passing through the fluid flow path 413 of the internal tube 414. In addition, as shown in FIG. 2, the fluid introduced to the fluid flow path 413 naturally has turbulence due to the turbulence-forming section 414a. As a result, the fluid or hot titania particles are cooled rapidly so that their particle characteristics are improved and the condensation recovery ratio is increased.

Particularly, since the fluid introduced to the internal tube 414 has turbulence due to the ball-like turbulence-forming section 414a, it has a long time (i.e. contact time with the coolant) to be in contact with the wall surface of the internal tube 414. In addition, the introduced fluid is in contact with the coolant over a large surface area due to the turbulence-forming section 414a. In other words, the turbulence-forming section 414a has a ball-like shape as shown in FIG. 2, and thus causes an increase in contact area between the fluid (titania particles) and the coolant. As a result, the hot titania particles are cooled rapidly in a short time to increase the condensation recovery ratio, while improving the particle characteristics, such as specific surface area and pore volume by virtue of such rapid cooling (condensation).

The recovery unit 400 may comprise one or two or more such rapid cooling systems 410. In other words, a single rapid cooling system 410 or two or more such rapid cooling systems connected in series may be used to facilitate cooling. In addition, there is no limitation in length of the rapid cooling system 410. As shown in FIG. 1, a particle collecting system 420 is linked to the rear end of the rapid cooling system 410.

The method for preparing a vanadia-titania catalyst will now be described.

The method for preparing a vanadia-titania catalyst disclosed herein comprises: vaporizing a titanium precursor; conveying the vaporized titanium precursor to a reaction unit together with an oxygen supplying source; reacting the vaporized titanium precursor conveyed to the reaction unit with the oxygen supplying source to produce titania particles; condensing the titania particles, collecting and recovering them; mixing the recovered titania particles with a vanadium precursor solution; drying the mixture of the titania particles with the vanadium precursor solution; and calcining the dried mixture under oxygen atmosphere or air. Hereinafter, each operation forming the method will be described in detail. As described above, the preparation of titania particles (carriers) (i.e. the $1^{st}$-$4^{th}$ operation) may be carried out in the apparatus as described hereinbefore.

Vaporization

First, a titanium precursor is vaporized (allowed to volatilize) to produce a vaporized product. The vaporization may be performed at the precursor supplying unit 100 of the above-described apparatus. As used herein, vaporization (volatilization) does not mean merely a thermal conversion from a liquid (solid) titanium precursor into a complete gas state but also comprises atomization to an effervescent state.

In addition, particular examples of the titanium precursor are the same as described above. In the vaporizing operation, the titanium precursor is vaporized (or atomized) into a vapor phase so as to obtain high reactivity in the reaction unit 300. When the titanium precursor is not vaporized (or atomized) but supplied to the hot reaction unit 300 in a liquid phase, the yield (productivity) of titania particles in the reaction unit 300 may be lowered and the particle characteristics (particle size and dispersibility) may be degraded.

The vaporization operation may be carried out by heating the titanium precursor to an adequate temperature depending on the particular type and amount of the titanium precursor. Although there is no particular limitation, the titanium precursor may be vaporized (or atomized) by heating it to a temperature of 50-200° C. For example, when using an organic compound, such as titanium alkoxide, as a titanium precursor, vaporization may be carried out at a temperature of 80-110° C. considering the boiling point of the compound. More particularly, vaporization may be carried out by maintaining the temperature of the bubbler 122 of the precursor supplying unit 100 at the above temperature range. When the temperature is excessively low, the vaporized product is generated at a low concentration, resulting in a drop in productivity (yield) of titania particles. On the other hand, when the temperature is excessively high, the vaporized product is generated at a high concentration, resulting in degradation of particle characteristics (e.g. formation of excessively large titania particles).

Conveying Reactants

The vaporized product of titanium precursor is conveyed to the reaction unit 300 together with an oxygen source. The vaporized product of titanium precursor may be conveyed and supplied to the reaction unit 300 along the precursor supplying line 140 as described above. In addition, the oxygen source may be conveyed and supplied to the reaction unit 300 along the conveying line 220 of the oxygen supplying line 200 as described above.

Reaction

Titania particles are produced from the vaporized product of titanium precursor. Particularly, the vaporized product of titanium precursor and an oxygen source are supplied to the reaction unit 300 to produce titania particles. The oxygen source serves as a source of oxygen for titania, as well as functions to protect the vaporized product of titanium precursor from the ingredients (e.g. reaction gas introduced from the exterior, or the like) that may adversely affect the production of particles during the passage through the reaction tube 310. In addition, when a gas, such as pressurized gas, is used as an oxygen source, it may also serve as a carrier for the vaporized product of precursor.

In addition, the vaporized product of precursor may be supplied to the reaction unit 300 together with a carrier gas. The carrier gas serves as a carrier as mentioned earlier, and may be supplied through a carrier gas supplying line 160.

The reaction temperature may depend on the particular type of the titanium precursor. For example, the reaction temperature may be 700-1200° C. When the reaction temperature is lower than 700° C., it is difficult to perform thermal decomposition of the titanium precursor and sufficient crystallization (formation) of titania particles, resulting in a drop in yield (productivity). When the reaction temperature is higher than 1200° C., the resultant particles may become crude and undergo a transition from anantase to rutile. Considering these, the reaction temperature may be 800° C. or higher, and particularly 800-1100° C.

Recovering

Then, the titania particles obtained from the reaction operation are recovered. The recovering operation comprises cooling and condensing the titania particles obtained from the reaction operation, and collecting the condensed (cooled) titania particles. The cooling operation may be carried out by using a rapid cooling system 410 having a turbulence-forming section 414a provided on the flow path 413 of the titania particles as described earlier.

Particularly, the product (fluid) ejected from the reaction unit 300 contains, in addition to titania particles as a target product, a hot gas (carrier gas or the like) and vaporous materials, such as vaporous organic materials generated by thermal decomposition of the titanium precursor, and maintains high temperature. For the purpose of separation and removal of such vaporous materials, the recovering operation comprises condensing (cooling) the titania particles obtained from the reaction, and collecting and recovering titania particles from the condensed (cooled) product. The cooling operation may be carried out by using the above-mentioned cooling system 410, i.e. the rapid cooling system 410 described hereinabove with reference to FIG. 2. In other words, the above-described rapid cooling system 410 having a turbulence-forming section 414a formed on the fluid flow path 413 is used to carry out the cooling operation. In addition, the collecting operation may be carried out by using the above-described particle collecting system 420.

The titania particles obtained in the above-described manner (i.e. titania particles recovered from the recovering operation) are porous particles prepared via chemical vapor synthesis comprising vaporizing a titanium precursor, and are condensed by rapid cooling to provide a large specific surface area and ultrafine nano-scaled uniform particle size. In addition, particle agglomeration (aggregation) is prevented and an increased pore volume is obtained. Particularly, according to an embodiment, it is possible to obtain titania particles (carriers) having a specific surface area of 100 $m^2$/g-150 $m^2$/g. It is also possible to obtain titania particles (carriers) having a sufficient pore volume corresponding to an average pore volume of 0.1 $cm^3$/g-0.2 $cm^3$/g and a uniform nano-scaled size corresponding to an average particle size of 5 nm-15 nm.

In addition, the titania particles (carriers) have high dispersibility upon supporting a catalyst (vanadia) thereon. Particularly, due to such a uniform nano-scaled size, high specific surface area and an increased pore volume, vanadia (catalyst) is dispersed and supported on the surface of the titania particles (carriers) uniformly with a broad distribution. Therefore, the catalyst has improved characteristics to enhance nitrogen oxide removal efficiency. Also, the catalyst has excellent denitrogenation efficiency even in a low temperature range of 200-250° C. Further, the process for preparing the catalyst is continuous and time efficient, thereby allowing mass production. As described above, the titania particles (carriers) are collected with a high yield (yield after condensation) by virtue of the above-mentioned rapid cooling (condensation).

Mixing

In order to support vanadia on carriers, the recovered (obtained) titania particles are mixed with a vanadium precursor solution.

Particularly, a vanadium precursor solution containing a vanadium precursor and acid is obtained first. More particularly, a vanadium precursor is dissolved in water (distilled water), and then an acid is added thereto to provide an acidic solution with pH 2.5-3. Then, the resultant solution is heated and agitated at 55-75° C. (for example, heated and agitated for 1-3 hours) to obtain a vanadium precursor solution (aqueous acidic solution). After that, the vanadium precursor solution (acidic solution) is mixed and agitated (for example, mixed and agitated for 1-3 hours) with the titania particles to obtain a mixture containing the vanadium precursor solution in which the titania particles are impregnated and dispersed. There is no particular limitation in the acid. For example, oxalic acid [$(COOH)_2$] may be used.

Herein, the vanadium precursor is not particularly limited, as long as it contains vanadium (V) in its molecule. The vanadium precursor may be selected from vanadium salts and organovanadium compounds. Particularly, the vanadium precursor may be selected from vanadium ammonate ($NH_4VO_3$) and the like.

Drying

Then, the mixture is dried. In other words, the mixture containing the vanadium precursor solution (acidic solution) with the titania particles is dried. The drying operation may comprise evaporating water of the mixture containing the vanadium precursor solution (acidic solution) with the titania particles by using a vacuum evaporator, and drying the evaporated mixture in a drying furnace at a temperature of 100-120° C. The mixture may be retained in the drying furnace for at least 10 hours.

Calcining

Then, the dried mixture is fired under air or oxygen atmosphere. The calcining operation may be carried out by heat treatment in a calcining furnace under air or oxygen atmosphere for at least 3 hours, particularly, 3-6 hours, while maintaining the temperature of the calcining furnace at 450-600° C. As a result of such calcining, the vanadium precursor is crystallized on the surface of titania particles so that vanadia is supported on the titania particles. More particularly, vanadia may be supported in an amount of 1-10 wt % based on the total weight of the catalyst (combined weight of titania+ vanadia). In other words, the resultant vanadia-titania catalyst may comprise vanadia in an amount of 1-10 wt % based on the total weight of the catalyst.

The vanadia-titania catalyst disclosed herein comprises vanadia supported on titania particles obtained by incorporating titania particles (carriers) prepared via chemical vapor condensation to a vanadium precursor solution, followed by calcining. Since vanadia and titania undergo elemental rearrangement and substitution during the calcining, the catalyst has an increased specific surface area as compared to original titania. Particularly, the vanadia-titania catalyst obtained from the calcining operation has a specific surface area increased by 1.5-3 times after supporting vanadia, as compared to the titania particles recovered after the recovering operation. Particularly, the vanadia-titania catalyst may have a specific surface area of 200 $m^2$/g-300 $m^2$/g, which is larger than the specific surface area (100 $m^2$/g-150 $m^2$/g) of the titania particles. In addition, after supporting vanadia, pore volume also increases. More particularly, the vanadia-titania catalyst has an increased average pore volume as compared to titania. Particularly, the vanadia-titania catalyst may have an average pore volume of 0.12 $cm^3$/g-0.4 $cm^3$/g. The above defined ranges of specific surface area and average pore volume are effective for removing nitrogen oxides.

In addition, after supporting vanadia, the catalyst has a reduced particle size as compared to titania. For example, after calcining, the vanadia-titania catalyst has an average particle size of 5-10 nm, which is smaller than titania. Further, the titania carriers used herein have a high specific surface area, and particularly a large pore volume, to avoid pore occlusion, and undergo an increase in specific surface area and pore volume after calcining. Thus, vanadia may be supported on the titania carriers with high dispersibility. As a result, the vanadia-titania catalyst has excellent nitrogen oxide removal efficiency, particularly in a low-temperature range.

The vanadia-titania catalyst disclosed herein is useful as a catalyst for removing nitrogen oxides in a selective catalytic reduction (SCR) process. Particularly, the catalyst is useful for reduction in removing nitrogen oxides. For example, nitrogen oxides may be removed by loading the vanadia-titania catalyst disclosed herein to a fixed bed reactor, and passing a gas to be treated through the fixed bed reactor. The gas to be treated contains nitrogen oxides and particular examples thereof comprise exhaust gas generated from power plants, incineration plants and various petrochemical plants.

As described above, the vanadia-titania catalyst disclosed herein has excellent activity so that it removes nitrogen oxides effectively even in a low-temperature range. In other words, even when the temperature during the removal of nitrogen oxides (i.e. the reaction temperature in the fixed bed reactor) is maintained at low temperature, it is possible to remove nitrogen oxides with high efficiency. Particularly, even when the reaction temperature (treatment temperature) is maintained at a low temperature lower than 300° C., more particularly 200-250° C., it is possible to obtain high nitrogen oxide removal efficiency corresponding to a nitrogen oxide decomposition efficiency of 97% or higher.

The examples and comparative examples will now be described. The following examples are for illustrative purposes only and not intended to limit the scope of the present disclosure.

Example 1

Preparation of Titania ($TiO_2$) Particles

Titania ($TiO_2$) particles are prepared via chemical vapor condensation by using the apparatus as shown in FIG. 1.

First, titanium tetra-iso-propoxide (TTIP, Ti[OCH$(CH_3)_2]_4$, available from Kanto Chemical Co. Inc, Japan) is introduced as a Ti precursor to the bubbler 122 of the titanium precursor supplying unit 100 of the apparatus as shown in FIG. 1, and is allowed to evaporate by maintaining the temperature at 95° C. by using an oil bath. Next, Ar gas is injected into the bubbler 122 of the titanium precursor supplying unit 100 as a carrier gas at a flow rate of 0.7 L/min to convey and supply the evaporated Ti precursor to the reaction tube 310. In addition, air is introduced into the reaction tube 310 at a flow rate of 7 L/min through the oxygen supplying line 200.

Figure 3:
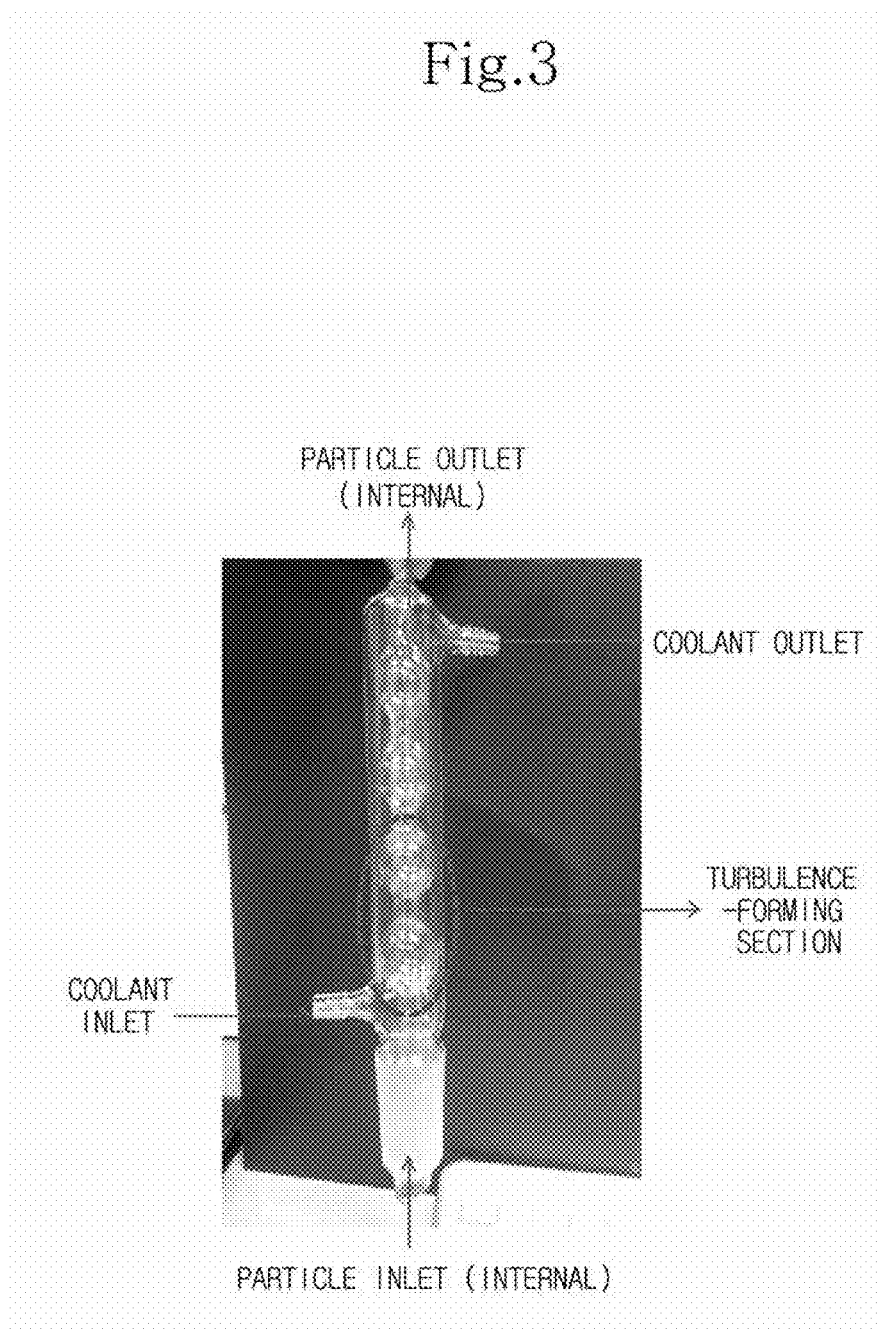
FIG. 3 is a photograph of a cooling system used in accordance with an embodiment.

Then, the reaction tube 310 is maintained at 900° C. by using an externally warmed electric furnace to produce $TiO_2$ particles. After that, the fluid containing the hot $TiO_2$ particles produced from the reaction tube 310 are condensed (cooled) to 10° C. by using the rapid cooling system 410 having a ball-like turbulence-forming section 414a as shown in FIG. 2. FIG. 3 is an actual photograph illustrating the rapid cooling system 410 used in this example. After condensing the particles in the rapid cooling system 410, the condensed $TiO_2$ particles are collected and recovered by using a cyclone type particle collecting system.

<Preparation of Catalyst>

Vanadia is supported on the titania particles obtained as described above to obtain a vanadia-titania catalyst.

Figure 4:
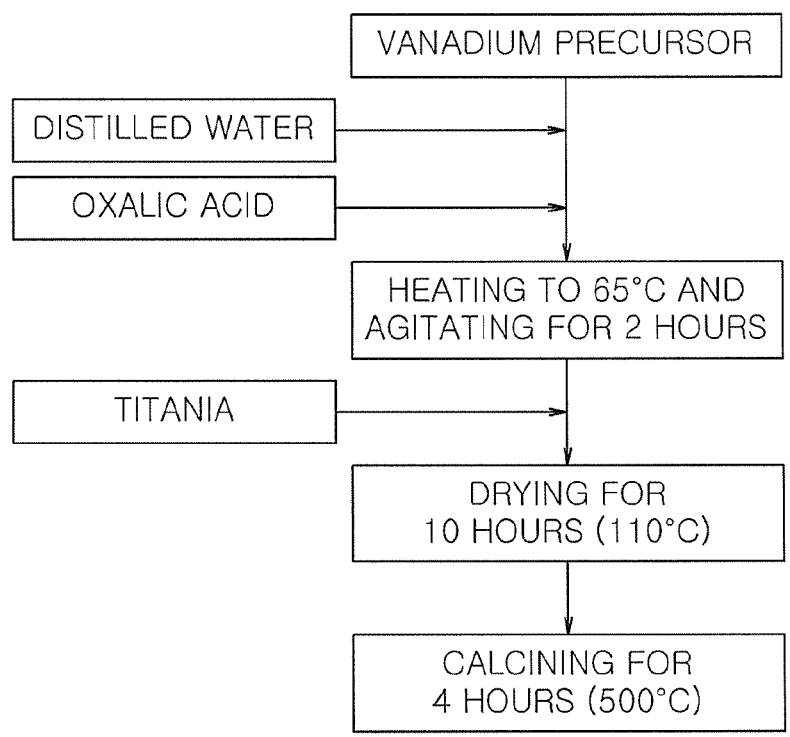
FIG. 4 is a flow chart illustrating a process for supporting vanadia in accordance with an embodiment.

First, vanadium ammonate ($NH_4VO_3$) is dissolved into distilled water as a vanadium precursor, oxalic acid $[(COOH)_2]$ is added thereto to adjust the resultant solution to pH 2.5, and the resultant solution is agitated at 65° C. for 2 hours. The titania ($TiO_2$) particles obtained as described above is introduced to the resultant solution, followed by mixing and agitation for 2 hours. Then, water is evaporated by using a vacuum evaporator. Next, the resultant mixture is introduced to a drying furnace to dry it at 110° C. for about 10 hours, and then introduced to a calcining furnace to fire the dried mixture at 500° C. for 4 hours under air. In this manner, a vanadia-titania catalyst comprising titania ($TiO_2$) on which vanadia crystal phase is supported in an amount of 5.0 wt % is obtained. FIG. 4 is a flow chart illustrating the above-described process for supporting vanadia.

Comparative Example 1

A commercially available vanadia-titania catalyst used currently in a power plant or incineration plant is used as a sample according to Comparative Example 1.

Comparative Example 2

For the comparison with the characteristics of the titania ($TiO_2$) particles prepared via chemical vapor condensation as disclosed herein, commercially available titania ($TiO_2$) particles (P25 available from Degussa) prepared via a liquid phase process according to the related art are provided. Then, vanadia is supported on the titania ($TiO_2$) particles (Degussa P25) in the same manner as described in Example 1, thereby providing a vanadia-titania catalyst comprising titania ($TiO_2$) particles (Degussa P25) on which vanadia crystal phase is supported in an amount of 5.0 wt %.

<Evaluation of Particle Size, Specific Surface Area and Surface Activity of Catalyst>

The titania particles (before supporting vanadia) according to Example 1 and Comparative Examples 1 and 2 and the corresponding vanadia-titania catalyst particles (after supporting vanadia) are determined for their specific surface areas based on the Brunauer-Emmett-Teller (BET) method. The results are shown in the following Table 1. In addition, the average particle size of each sample is determined before and after supporting vanadia, and the results are also shown in the following Table 1. Further, Table 1 also shows the results of evaluation of surface activities of catalysts expressed in terms of a ratio ($V^{4+}/V^{5+}$) of tetravalent vanadium ($V^{4+}$) to pentavalent vanadium ($V^{5+}$) according to X-ray photoelectron spectroscopy (XPS).

TABLE 1

<Results of Characterization before and after Supporting Vanadia>

| | Particle Size | | Specific Surface Area | | |
|---|---|---|---|---|---|
| | Before supporting V | After supporting V | Before supporting V | After supporting V | $V^{4+}/V^{5+}$ |
| Ex. 1 (Chemical | 10.2 | 5.7 | 107.5 | 270.5 | 0.95 |

TABLE 1-continued

<Results of Characterization before and after Supporting Vanadia>

| | Particle Size | | Specific Surface Area | | |
| --- | --- | --- | --- | --- | --- |
| | Before supporting V | After supporting V | Before supporting V | After supporting V | $V^{4+}/V^{5+}$ |
| Vapor Condensation) | | | | | |
| Comp. Ex. 1 (Commercially Available Catalyst) | — | 19.8 | — | 78.8 | 0.33 |
| Comp. Ex. 2 (Degussa P25) | 26.9 | 29.1 | 52.2 | 53.1 | 0.35 |

Figure 6:
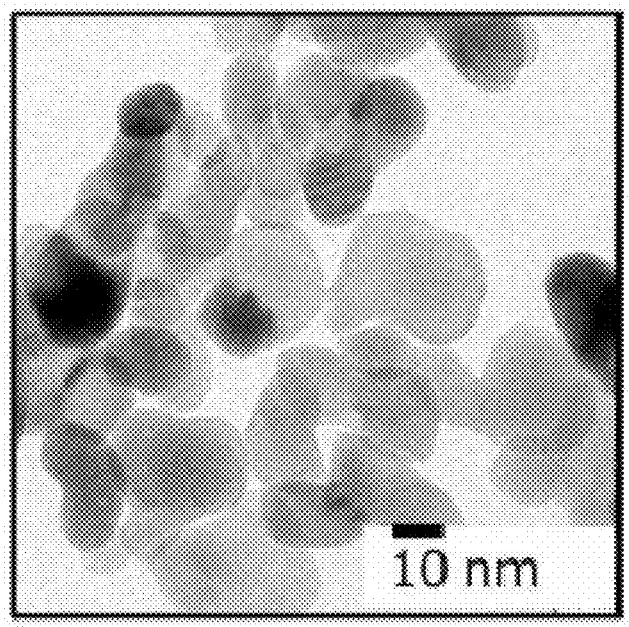
FIG. 6 is a TEM image of commercially available vanadia-titania catalyst particles according to Comparative Example 1.

FIG. 5 is a transmission electron microscopy (TEM) image of titania particles (before supporting) according to Example 1, and vanadia-titania catalyst particles (after supporting) comprising titania particles on which vanadia is supported. FIG. 6 is a TEM image of commercially available vanadia-titania catalyst particles according to Comparative Example 1. FIG. 7 is a TEM image of commercially available titania particles (before supporting) according to Comparative Example 2 and vanadia-titania catalyst particles (after supporting) comprising titania particles on which vanadia is supported.

First, as shown in FIG. 5 and Table 1, the titania particles (carriers) obtained according to an embodiment via chemical vapor condensation have a fine particle size of about 10 nm, and show a botryoidal shape having densely agglomerated particles. In addition to such a fine particle size, the titania particles have a specific surface area of 107.5 m²/g, which is significantly improved as compared to the commercially available titania particles (Degussa P25). Particularly, after supporting vanadia, the vanadia-titania catalyst has a decreased size of 5.7 nm and a specific surface area of 270 m²/g (i.e., at least two times higher than the specific surface area before supporting). In brief, the titania particles disclosed herein has a significantly high specific surface area as compared to the commercially available catalyst (Comp. Ex. 1) or the catalyst using the commercially available titania particles (Degussa P25).

In addition, as shown in FIG. 6 and Table 1, the commercially available catalyst (Comp. Ex. 1) has a low specific surface area of 78.8 m²/g and shows a botryoidal shape having loosely agglomerated particles.

Further, as shown in FIG. 7 and Table 1, the commercially available titania particles (Degussa P25) used wisely as a carrier for catalyst have a large particle size of 26.9 nm and a low specific surface area of 52.2 m²/g. In addition, the catalyst comprising the titania particles on which vanadia is supported has a particle size of 29.1 nm and a specific surface area of 53.1 m²/g, which are significantly poor as compared to the characteristics according to Example 1. Even after supporting vanadia, the comparative catalyst undergoes no significant change in particle size and particle agglomeration degree, and shows little change in specific surface area.

Figure 8:
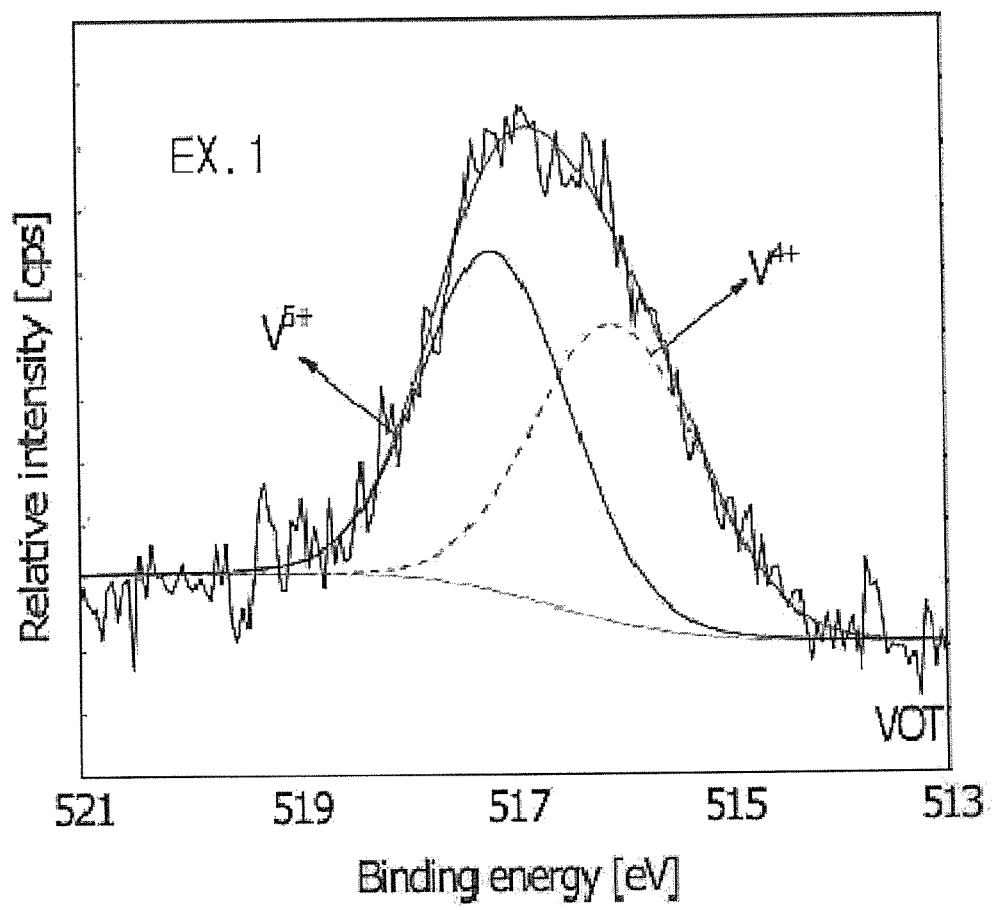
FIG. 8 is a graph showing the X-ray photoelectron spectroscopy (XPS) results of the vanadia-titania catalyst particles according to an embodiment.
Figure 9:
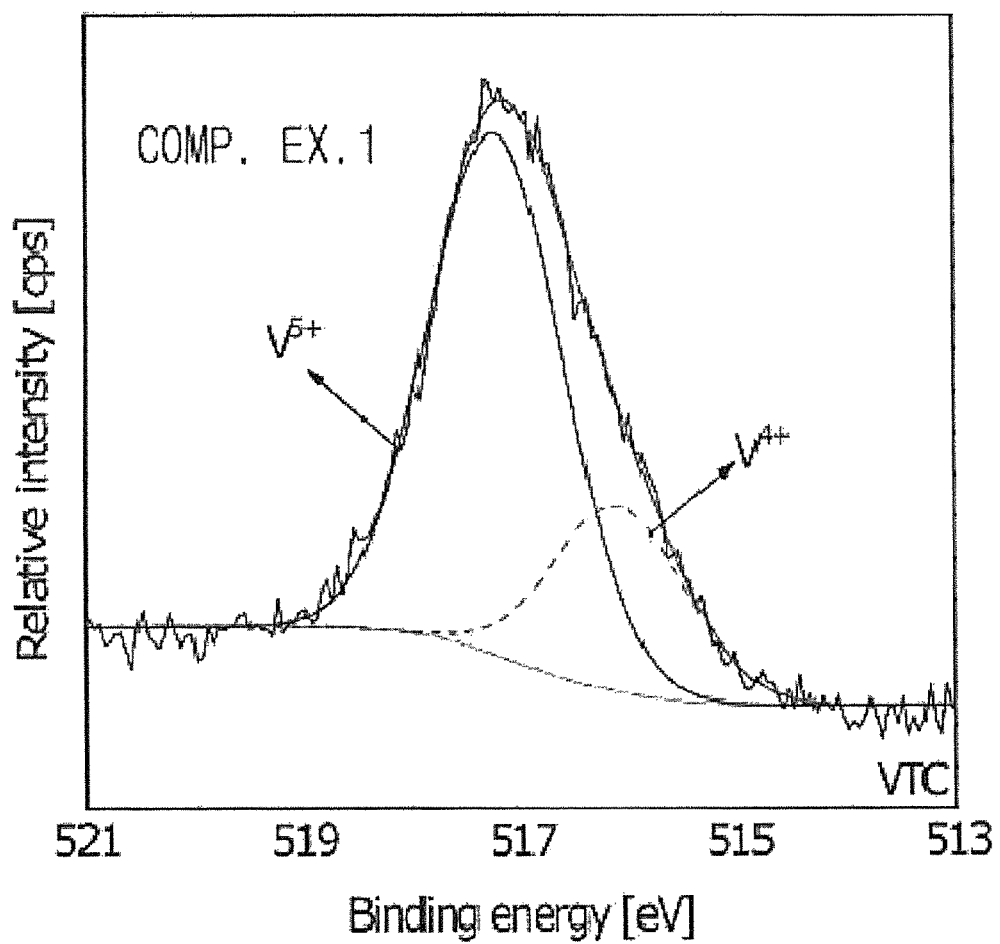
FIG. 9 is a graph showing the XPS results of commercially available vanadia-titania catalyst particles according to Comparative Example 1.
Figure 10:
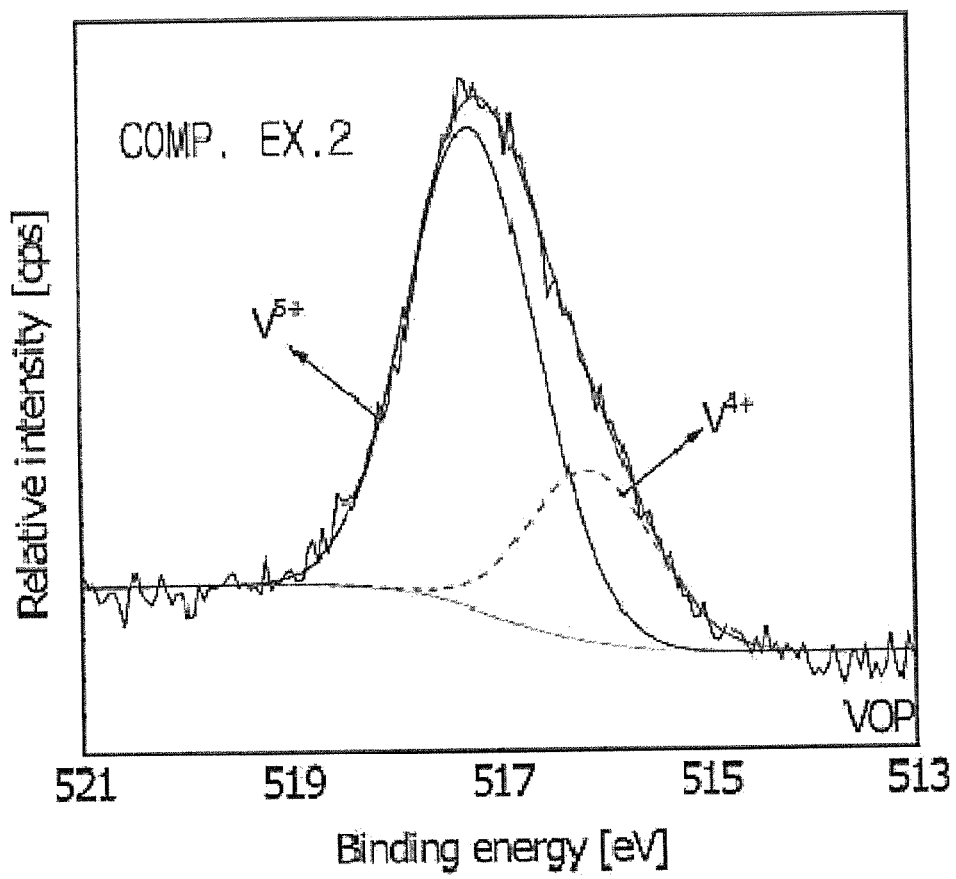
FIG. 10 is a graph showing the XPS results of vanadia-titania catalyst particles according to Comparative Example 2.

FIG. 8 is a graph showing the X-ray photoelectron spectroscopy (XPS) results of the vanadia-titania catalyst particles according to Example 1. FIG. 9 is a graph showing the XPS results of commercially available vanadia-titania catalyst particles according to Comparative Example 1. FIG. 10 is a graph showing the XPS results of vanadia-titania catalyst particles according to Comparative Example 2.

As shown in FIG. 8-FIG. 10, after evaluating the surface activity of each vanadia-titania catalyst through one of the methods for evaluating the surface activity of a catalyst, i.e., XPS, the commercially available vanadia-titania catalyst (Comp. Ex. 1) and the catalyst (Comp. Ex. 2) comprising the commercially available titania particles (Degussa P25) on which vanadia is supported have a $V^{4+}/V^{5+}$ value of 0.33 and 0.35, respectively. On the contrary, the vanadia-titania catalyst (Ex. 1) comprising titania particles obtained via chemical vapor condensation and vanadia supported thereon has a $V^{4+}/V^{5+}$ value of 0.95. In other words, in the vanadia-titania catalyst disclosed herein, tetravalent vanadium and pentavalent vanadium are present at a similar proportion. This suggests that the vanadia-titania catalyst comprising titania particles obtained via chemical vapor condensation and vanadia supported thereon has excellent surface catalytic activity.

<Evaluation of Nitrogen Oxide Removal Efficiency>

To determine the activity of each vanadia-titania catalyst according to Ex. 1 and Comp. Ex. 1 and 2, nitrogen oxide removal efficiency is measured for a typical nitrogen oxide, nitrogen monoxide (NO).

First, 5.0 g of the vanadia-titania catalyst according to Example 1 is charged to a fixed bed reactor, and determined for reactivity from 100° C. to 400° C. at an interval of 25° C. for two hours per temperature range. 200 ppm of nitrogen monoxide (NO) is passed through the reactor and the introduced nitrogen monoxide (NO) is allowed to pass through the catalyst layer at a space velocity of 50,000 $h^{-1}$ by using pressurized air. In addition, the concentration of nitrogen monoxide (NO) is analyzed by a gas analyzer at the top (inlet) and the bottom (outlet) of the catalyst layer. The efficiency of NO decomposition as a function of an increase in temperature is calculated based on the following Mathematical Formula. The results are shown in FIG. 11.

Further, the efficiency of NO decomposition of the commercially available vanadia-titania catalyst (Comp. Ex. 1) and that of the catalyst (Comp. Ex. 2) comprising the commercially available titania particles (Degussa P25) on which vanadia is supported are evaluated in the same manner as described above. The results are also shown in FIG. 11.

Decomposition efficiency (%)=[Nitrogen monoxide concentration (residual amount) after reaction/ initial nitrogen monoxide concentration]×100
          [Mathematical Formula]

Figure 11:
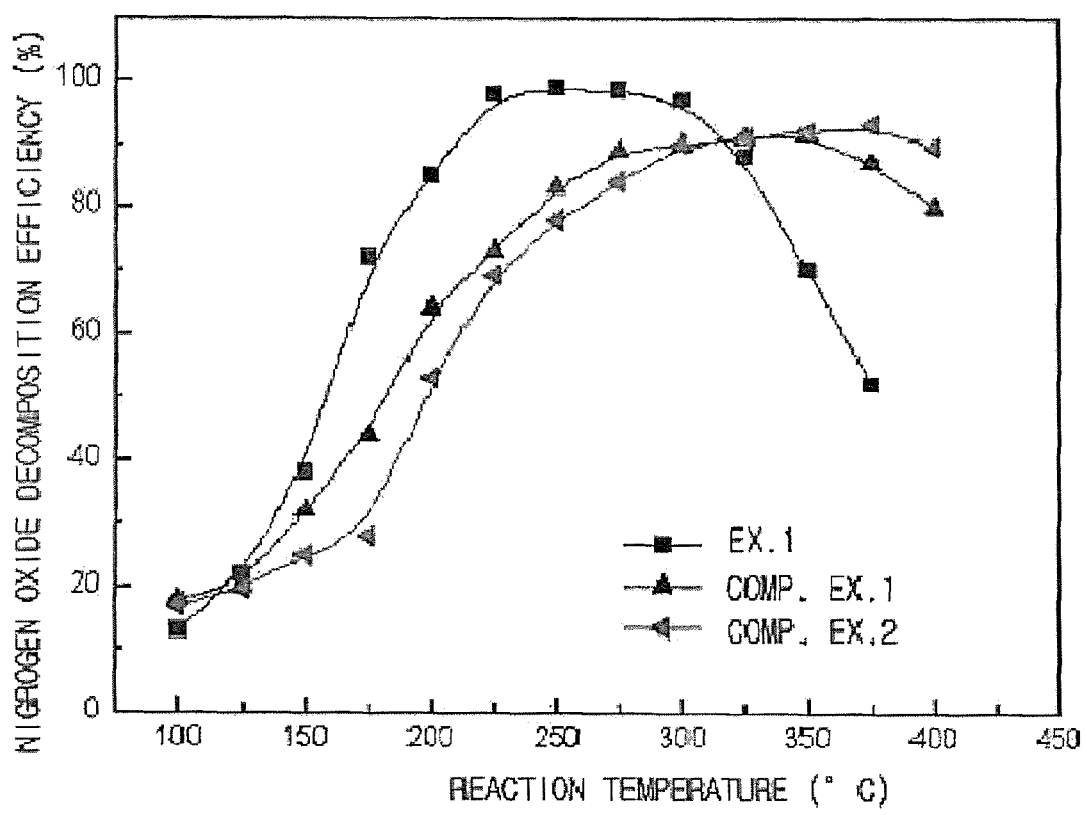
FIG. 11 is a graph showing the results of evaluation of nitrogen oxide decomposition efficiency of each of the vanadia-titania catalysts according to Example and Comparative Examples 1 and 2.

As shown in FIG. 11, after evaluating the nitrogen oxide removal efficiency of each of the catalysts according to Ex. 1 and Comp. Ex. 1 and 2, the commercially available vanadia-titania catalyst (Comp. Ex. 1) and the catalyst (Comp. Ex. 2) comprising the commercially available titania particles (Degussa P25) on which vanadia is supported show a nitrogen oxide removal efficiency of at most 90% approximately at 300° C. On the contrary, the vanadia-titania catalyst (Ex. 1) comprising titania particles obtained via chemical vapor condensation and vanadia supported thereon shows a nitrogen oxide removal efficiency of 97% or higher at a temperature of 200-275° C. Thus, the vanadia-titania catalyst disclosed herein has excellent nitrogen oxide removal efficiency in a low temperature range.

As can be seen from the foregoing, when supporting vanadia on titania particles (carriers) obtained via chemical vapor condensation, the resultant catalyst has a fine nano-scaled particle size and high specific surface area and dispersibility of the catalyst to be supported, and thus provides excellent nitrogen oxide removal efficiency, particularly in a low temperature range.

What is claimed is:

1. A method for preparing a vanadia-titania catalyst, comprising:

vaporizing a titanium precursor;

conveying the vaporized titanium precursor to a reaction unit together with an oxygen supplying source;

reacting the vaporized titanium precursor conveyed to the reaction unit with the oxygen supplying source to produce titania particles;

condensing the titania particles, collecting and recovering them;

mixing the recovered titania particles with a vanadium precursor solution;

drying the mixture of the titania particles with the vanadium precursor solution; and calcining the dried mixture under oxygen atmosphere or air, wherein the vanadia-titania catalyst obtained from said calcining has a specific surface area 1.5-3 times higher than the specific surface area of the titania particles recovered from said recovering.

2. The method for preparing a vanadia-titania catalyst according to claim 1, wherein said recovering the titania particles comprises cooling the titania particles to condense them and collecting the condensed titania particles, and wherein said cooling is carried out by using a cooling system having a turbulence-forming section on a flow path of the titania particles.

3. The method for preparing a vanadia-titania catalyst according to claim 2, wherein the cooling system comprises an external tube, an internal tube formed inside the external tube, and a coolant flow path through which a coolant flows formed between the internal tube and the external tube, and wherein the internal tube has a flow path through which the titania particles pass, and the flow path has a turbulence-forming section against which the titania particles introduced to the flow path bumps to form turbulence.

4. The method for preparing a vanadia-titania catalyst according to claim 1, wherein the titania particles recovered from said recovering have a specific surface area of 100 $m^2/g$-150 $m^2/g$.

5. The method for preparing a vanadia-titania catalyst according to claim 1, wherein said mixing the titania particles with a vanadium precursor solution is carried out by dissolving a vanadium precursor into water, adding oxalic acid thereto to adjust pH to 2.5-3, heating and agitating the mixture at a temperature of 55° C.-75° C. to obtain a vanadium precursor solution, and mixing the obtained vanadium precursor solution with the titania particles.

6. The method for preparing a vanadia-titania catalyst according to claim 5, wherein said drying comprises evaporating water of the mixture containing the vanadium precursor solution with the titania particles by using a vacuum evaporator, and drying the evaporated mixture in a drying furnace at a temperature of 100-120° C.

7. The method for preparing a vanadia-titania catalyst according to claim 1, wherein said calcining is carried out in a calcining furnace at a temperature of 450-600° C.

8. The method for preparing a vanadia-titania catalyst according to claim 1, wherein the vanadia-titania catalyst obtained from said calcining has a specific surface area of 200 $m^2/g$-300 $m^2/g$.

* * * * *